United States Patent [19]
Kato et al.

[11] Patent Number: 5,757,421
[45] Date of Patent: *May 26, 1998

[54] METHOD AND APPARATUS FOR ENCODING MOVING PICTURE SIGNALS AND RECORDING MOVING PICTURE SIGNALS

[75] Inventors: Motoki Kato, Kanagawa; Tsuyoshi Oda, Chiba; Katsumi Tahara, Kanagawa, all of Japan

[73] Assignee: Sony Corporation, Tokyo, Japan

[*] Notice: The term of this patent shall not extend beyond the expiration date of Pat. No. 5,675,379.

[21] Appl. No.: 838,422

[22] Filed: Apr. 7, 1997

Related U.S. Application Data

[63] Continuation of Ser. No. 520,840, Aug. 29, 1995, Pat. No. 5,675,379.

[30] Foreign Application Priority Data

Aug. 31, 1994 [JP] Japan .................. 06-230463

[51] Int. Cl.$^6$ .................. H04N 5/253; H04N 9/11; H04N 9/47; H04N 3/36
[52] U.S. Cl. .................. 348/97; 348/384; 348/405; 348/414; 386/46; 386/109; 386/111; 386/131
[58] Field of Search .................. 348/96, 97, 384, 348/390, 405, 414, 417, 418, 419, 422; 386/33, 109, 111, 112, 131, 46; H04N 3/36, 5/253, 9/11, 9/47

[56] References Cited

U.S. PATENT DOCUMENTS

| | | | |
|---|---|---|---|
| 5,301,242 | 4/1994 | Gonzales et al. | 348/384 |
| 5,381,275 | 1/1995 | Nitta et al. | 386/112 |
| 5,419,516 | 5/1995 | Casavant et al. | 348/415 |
| 5,452,011 | 9/1995 | Martin et al. | 348/526 |
| 5,461,420 | 10/1995 | Yonemitsu et al. | 348/401 |
| 5,475,502 | 12/1995 | Lee et al. | 348/384 |
| 5,521,713 | 5/1996 | Oikawa | 386/112 |
| 5,563,660 | 10/1996 | Tsukagoshi | 348/384 |

*Primary Examiner*—Thai Tran
*Assistant Examiner*—Vincent F. Boccio
*Attorney, Agent, or Firm*—Frommer Lawrence & Haug LLP; William S. Frommer

[57] ABSTRACT

A method and apparatus for encoding moving picture signals. A plurality of encoding picture groups, each consisting of a pre-set number of encoding pictures freed of redundant pictures from a plurality of original pictures represented by the input moving picture signals, are formed, and the number of original pictures used for forming the encoding picture groups and the group-based target bit amount are calculated. The moving picture signals of the encoding pictures are encoded from one picture group to another based upon the target bit amount. Even if the encoding picture rate is changed from one picture group to another, the target bit amount can be adaptively controlled with these changes in the encoding picture rate. Consequently, there is no risk of the output bit rate significantly surpassing the target value. In addition, there is no risk of the total bit amount in the bit stream exceeding the target amount to render it impossible to record the bit stream on a desired moving picture signal recording medium.

1 Claim, 10 Drawing Sheets

METHOD AND APPARATUS FOR ENCODING MOVING PICTURE SIGNALS AND RECORDING MOVING PICTURE SIGNALS

This application is a continuation of application Ser. No. 08/520,840, filed Aug. 29, 1995, now U.S. Pat. No. 5,675,379.

BACKGROUND OF THE INVENTION

This invention relates to a method and apparatus for encoding moving picture signals, and a recording medium for recording moving picture signals. More particularly, it relates to a method and apparatus for encoding moving picture signals, employed for recording moving picture signals on a recording medium, such as a magneto-optical disc or a magnetic tape, reproducing the moving picture signals from the recording medium for display or transmitting moving picture signals over a transmission channel from a transmitting side to a receiving side, such as in a teleconferencing system, video telephone system or a broadcasting equipment, and a recording medium for recording the moving picture signals.

If the moving picture signals are directly digitized, the data volume will become tremendous, such that, for transmitting data of the moving picture signals over a transmission channel of a limited transmission capacity, data encoding (compression) becomes necessary.

In general, the moving pictures are not steady such that picture patterns or movements are changed with lapse of time. In addition, the picture patterns or movements in the same picture may be changed significantly at the mid region or at peripheral regions. Thus the amount of the information generated at an encoder configured for encoding the moving picture signals is also changed significantly depending on these changes in the picture patterns or movements. In order for the encoder output, that is the amount of the information produced by the encoder, which is changed from picture to picture, to be transmitted at a constant transmission bit rate, a transmission buffer is provided at the ultimate stage of the encoder. That is, the encoder output, which is changed from picture to picture, is temporarily stored in a transmission buffer, and read out at a constant bit rate and sent over the transmission channel for maintaining a constant data quantity of the encoder output.

As a control unit for the encoder output, that is the amount of information, a group unit consisting of plural consecutive pictures is frequently employed. That is, the control method is used in which the total amount of the information for the group is suppressed to be not higher than a target value, even although the amount of the information is changed in the group from picture to picture. The number of the pictures of the group is usually fixed. Among the widely used number of pictures is the group of pictures (GOP) adopted in MPEG2 (ISO/IEC 13818).

In FIG. 1, there is shown, in a block diagram, an illustrative circuit construction of an encoding apparatus (encoder) configured for controlling the amount of the generated information on the GOP basis. An original input picture signal S1 entering a terminal 100 is converted in a pre-processor 101 into a frame signal for encoding S2. In the pre-processor, no specific processing is executed.

The frame signal for encoding S2 enters an encoding unit 102 where it is encoded. The encoding unit 102 outputs the encoded information S3. The encoding unit 102 effects encoding by a hybrid encoding method which is widely known in MPEG2 and which consists in the combination of motion compensated predictive coding and discrete cosine transform (DCT). The encoded information S3 is temporarily stored in a transmission buffer 104, while being entered to a frame bit counter 106. The frame bit counter counts the number of bits of the encoded information S3 and outputs the count value as a bit quantity for encoding S7.

The above-described conventional encoder for encoding moving picture signals controls the amount of the generated information in terms of a GOP consisting of N pictures for encoding 10 (frame signal for encoding S2) as a unit, as shown in FIG. 2. That is, a calculator 108 calculates a target bit amount G, allocated to each GOP, in accordance with the following equation (1):

$$G = (bit\_rate \times N)/coded\_frame\_rate \qquad (1)$$

where coded_frame_rate is the frame rate of the frame signal for encoding S2, while bit_rate is the bit rate of the bit stream S4 outputted by the transmission buffer 104. The calculator 108 sets the target bit amount G as a signal S8 which is supplied via a switch 110 to a register 107.

On the other hand, a base-N counter 105 counts a frame synchronization signal for encoding S5, supplied thereto from the pre-processor 101 in synchronism with the frame signal for encoding S2 entering the encoding unit 102, for counting the number of frames entering the encoding unit 102 from 1 to N. The base-N counter 105 sets a flag S6 when the count value is 1 for controlling the switch 110 to be turned on. The result is that the target bit amount G is fed via switch 110 to the register 107, which then stores the target bit quantity G.

On the other hand, if a frame synchronization signal for encoding S5 is outputted by the pre-processor 101, a switch 109 is turned on. An encoding bit amount S7 of the frame signal for encoding S2, entered during the directly previous frame, enters the register 107, which then subtracts the encoding bit amount S7 from the target bit amount G. The frame bit counter 106 then is immediately cleared to zero.

Thus, at a tome instant the frame signal for encoding S2, encoded for the first time in the GOP, enters the encoding unit 102, the target bit amount G of the GOP is stored in the register 107. Then, each time the frame signal for encoding S2 is encoded, the encoding bit amount S7 is subtracted from the value of the register 107.

The value of the resister 107, that is a residual bit number S9 allocated to the GOP, is fed to an encoding parameter controller 103, which then controls the encoding parameter of the encoding unit 102 by an encoding parameter control signal S16 based upon the residual bit number S9. The encoding parameter controller manages control so that the target bit amount G allocated to the GOP approaches the actually generated bit amount. Thus, when the GOP is encoded in its entirety, the residual bit number S9 in the register 107 ideally becomes equal to zero.

The transmission buffer 104 has a storage capacity capable of sufficiently absorbing dynamic changes in the amount of the generated information in the GOP. Thus the transmission buffer 104 steadily reads out the encoding information stored therein at the designated bit rate and outputs the read-out information at a terminal 111. Thus, if the amount of the generated information is to be controlled on the GOP basis, the moving picture signal can be encoded using the above-described conventional moving picture encoding apparatus when the number of encoding pictures in each GOP, that is an encoding picture rate, is constant, as shown in FIG. 2.

It is now assumed that redundant pictures among the original input moving picture signals S1 are detected and eliminated so as not to enter the encoding unit 102. The redundant picture herein means such a picture which is a repetition of a directly previous past picture and hence need not to be encoded.

If the period of appearance of such redundant picture among the original input picture signals S1 is constant, the encoding picture rate becomes constant for all of the GOPS, so that the moving picture signals can be encoded using the above-described conventional moving picture signal encoding apparatus. For example, if a redundant picture appears every five pictures, the encoding picture rate $f_1$ is given by the following equation (2):

$$f_1 = 5/(699 \times \Delta t) \tag{2}$$

where $\Delta$ is the picture period of the original input picture signal S1.

However, if the period of appearance of the redundant picture 11 is disturbed, as shown in FIG. 3, due to, for example, video editing, the time of duration or display of each GOP consisting of N frames becomes variable such that the encoding picture rate $f_1$ becomes variable. Specifically, the time of duration of GOP-1, GOP-2 and GOP-3 becomes equal to $6 \times \Delta t$, $5 \times \Delta t$ and $7 \times \Delta t$, such that the encoding picture rate of each of GOP-1, GOP-2 and GOP-3 becomes $5/6 \times \Delta t$, $5/5 \times \Delta t$ and $5/7 \times \Delta t$, respectively, as shown in Table 1.

|       | duration (display) of each GOP | encoding picture rate of each GOP |
|-------|-------------------------------|-----------------------------------|
| GOP-1 | $6 \times \Delta t$           | $5/(6 \times \Delta t)$           |
| GOP-2 | $5 \times \Delta t$           | $5/(5 \times \Delta t)$           |
| GOP-3 | $7 \times \Delta t$           | $5/(7 \times \Delta t)$           |

Thus the conventional moving picture encoder controlling the amount of the generated information on the GOP basis suffers from the problem that, since coded_frame_rate in the equation (1) is changed, control of the amount of the generated information is likely to be infeasible. For example, with the encoding picture rate of the GOP-2 equal to $f_2$, as shown in FIG. 3, data is produced in the GOP-2 in an amount larger by $\Delta G$ as found by the equation (3):

$$\Delta G = (\text{bit\_rate} \times N)/f_1 - (\text{bit\_rate} \times N)/f_2 \tag{3}$$

The result is that the output bit rate exceeds the target bit amount G significantly. If such $\Delta G$ is added for the remaining GOPs in the original input picture signal, the total bit amount of the encoding bit stream S14 exceeds a design value such that the bit stream cannot be recorded on the desired a recording medium, such as a magneto-optical disc or a magnetic tape.

In addition, the transmission buffer 104 shown in FIG. 1 tends to overflow such that the buffer capacity control becomes unstable. Consequently, the encoding parameter in the encoding parameter controller 103 becomes difficult to control, as a result of which the picture quality tends to be deteriorated.

OBJECT AND SUMMARY OF THE INVENTION

It is therefore an object of the present invention to provide a method and apparatus for encoding moving picture signals whereby the amount of the generated information can be controlled correctly even if the group-based encoding picture rate is changed due to pre-processing for eliminating redundant pictures from the input moving picture at the time of encoding picture signals in the moving picture (moving picture signals).

In one aspect, the present invention provides a method for encoding input moving picture signals including forming encoding picture groups each consisting of a pre-set number of encoding pictures freed of redundant pictures from a plurality of original pictures represented by the input moving picture signals, calculating the number of original pictures used for forming said encoding picture groups, calculating the group-based target bit amount based upon the calculated number of original pictures, and encoding the moving picture signals of the encoding pictures on the basis of the target bit amount on the group basis.

The number of the encoding pictures making up each group may be variable. The step of calculating the target amount of the information includes the sub-steps of calculating the time duration of each group based upon the calculated number of the original pictures, and calculating the target amount of information of each group based upon the calculated time duration. The step of calculating the target amount of the information includes the sub-steps of calculating the encoding picture rate of each group based upon the calculated number of the original pictures, and calculating the target amount of information of each group based upon the calculated encoding picture rate.

In another aspect, the present invention provides an apparatus for encoding input moving picture signals including means for forming encoding picture groups each consisting of a pre-set number of encoding pictures freed of redundant pictures from a plurality of original pictures represented by the input moving picture signals, means for calculating the number of original pictures used for forming the encoding picture groups in the group forming means, means for calculating the group-based target bit amount based upon the calculated number of original pictures from the original picture number calculating means, and means for encoding the moving picture signals of the encoding pictures on the basis of the target bit amount on the group basis.

The number of the encoding pictures making up the groups in said group forming means may be variable.

In still another aspect, the present invention provides an apparatus for encoding input moving picture signals including pre-processing means for forming encoding picture groups each consisting of pre-set numbers of encoding pictures freed of redundant pictures from a plurality of original pictures represented by the input moving picture signals and for calculating the numbers of the original pictures used for forming the respective groups, means for calculating the time of duration of the respective groups based upon the numbers of the original pictures from the pre-processing means and storing the calculated time duration, means for calculating the degree of encoding difficulty of the respective groups based upon the input moving picture signals, memory means for storing the degree of encoding difficulties of the respective groups from the encoding difficulty calculating means, means for calculating the group-based target amount of the information based upon the duration of time from the time duration calculating means and the degree of encoding difficulties from said memory means, and encoding means for group-based encoding of the moving picture signals of the encoding pictures from the pre-processing means based upon the target amount of information from the information amount calculating means.

The information amount calculating mens provides a maximum value of the target amount of information. The time duration calculating means stores at least one of the number of original pictures from the pre-pressing means, the time duration calculated based upon the numbers of the original pictures and the encoding picture rate calculated based upon the numbers of the original pictures. The information amount calculating means calculates the target amount of information using the numbers of original pictures, time duration or the encoding picture rate as stored in the duration calculating means when the moving picture signals are encoded by the calculating means.

In yet another aspect, the present invention provides a recording medium for recording moving picture signals having recorded thereon a bit stream obtained on forming encoding picture groups each consisting of a pre-set number of encoding pictures freed of redundant pictures from a plurality of original pictures indicated by the input moving picture signals, calculating the number of original pictures used for forming the encoding picture groups, calculating the group-based target bit amount based upon the calculated number of original pictures, and encoding the moving picture signals of the encoding pictures on the basis of the target bit amount on the group basis.

In accordance with the present invention, the encoding picture groups each consisting of a pre-set number of encoding pictures freed of redundant pictures from a plurality of original pictures represented by the input moving picture signals are formed, and the number of original pictures used for forming the encoding picture groups and the group-based target bit amount are calculated. The moving picture signals of the encoding pictures are encoded from one picture group to another based upon the target amount of the information. Thus, even if the encoding picture rate is changed from one picture group to another, the target bit amount can be adaptively controlled for these changes in the encoding picture rate. Thus there is no risk of the output bit rate significantly surpassing the target value. In addition, there is no risk of the total bit amount in the bit stream exceeding the target amount thus disabling the recording of the bit stream on the desired moving picture signal recording medium. Also the transmission buffer capacity may be controlled in stability, so that the encoding parameters may be controlled stably to produce a clear stable picture.

DESCRIPTION OF PREFERRED EMBODIMENTS

Figure 1:
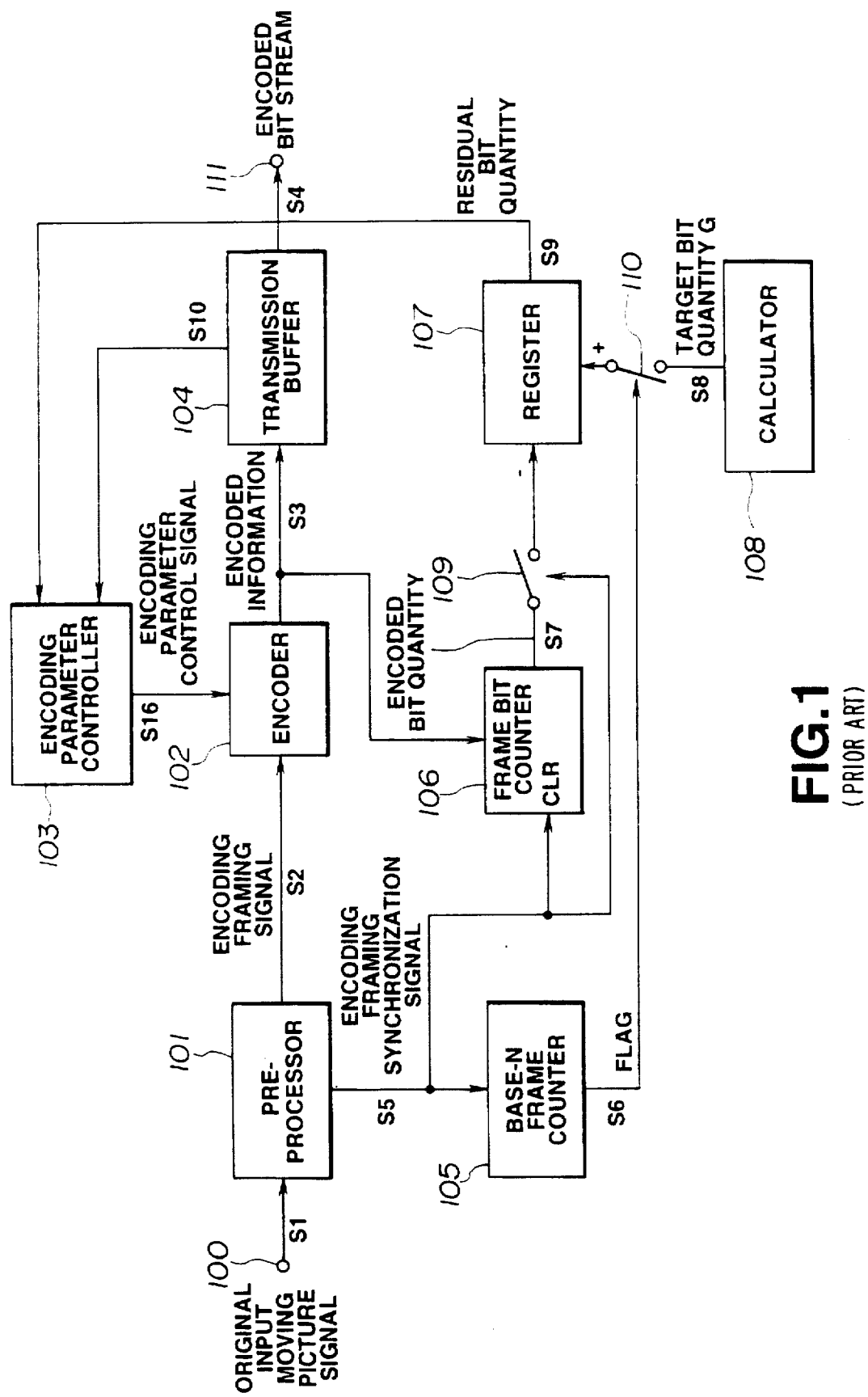
FIG. 1 is a block diagram showing the construction of a conventional moving picture signal encoding apparatus.
Figure 2:
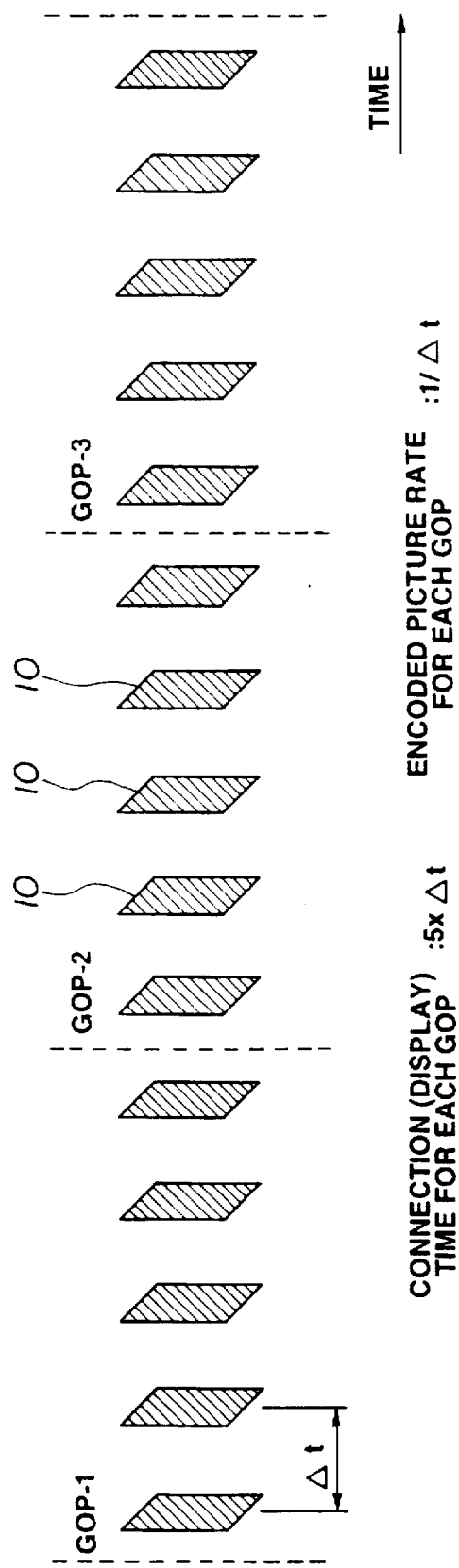
FIG. 2 illustrates the principle of encoding with five encoding pictures as a GOP.

Referring to the drawings, preferred embodiments of a method and apparatus for encoding moving picture signals and a recording medium for recording moving picture signals will be explained in detail. In the following embodiments, the present invention is applied to a moving picture signal encoding apparatus configured for encoding, as original moving picture signals, picture signals of a film source having its frame rate set to 30 Hz by the 2-3 or 3-2 pull-down system used in tele-cine.

The 2-3 pull-down system is briefly explained. For converting the film source, such as a motion picture, to interlaced video signals (telecine), the 2-3 pull-down system is widely employed. Specifically, if, with the film rate of 24 frames per sec (24 Hz), the rate of interlaced video signals is 30 frames/sec (60 fields/sec), the field number conversion is carried out by 2-3 pull-down. This is achieved by reading out the first one of two frames of a film in two fields of video signals and reading out the next frame of the film in three fields.

Figure 4:
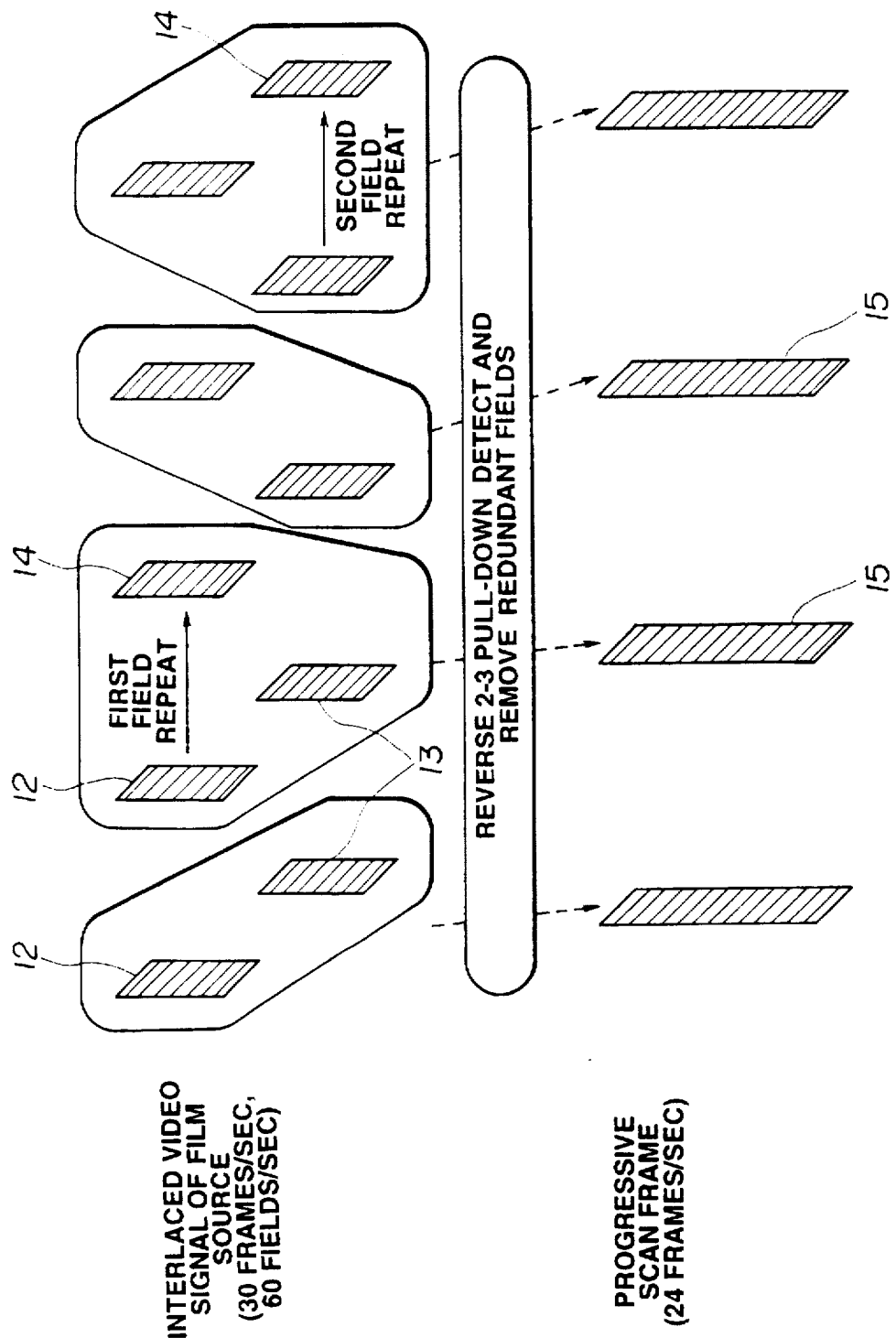
FIG. 4 illustrates an illustrative example in which inverse 2-3 pull-down in carried out ideally.

The inverse 2-3 pull down is carried out by detecting the frames of the film read out with three fields of the interlaced video signals of 30 frames/sec, removing redundant fields and producing a progressively scanned frame ideally at a rate of 24 frames/sec. FIG. 4 shows an illustrative example in which this has been achieved ideally. That is, redundant fields ideally appear at a period of five frames.

If the inverse 2-3 pull-down is achieved ideally, the encoding frame rate is constant at 24 Hz, such that the input moving picture signal can be encoded with the above-described conventional encoder. However, the inverse 2-3 pull-down cannot necessarily be achieved correctly for the following reason.

(1) The pattern of the redundant fields appearing at the period of five fields cannot be assured due to film editing following 2-3 pull-down.

Figure 7:
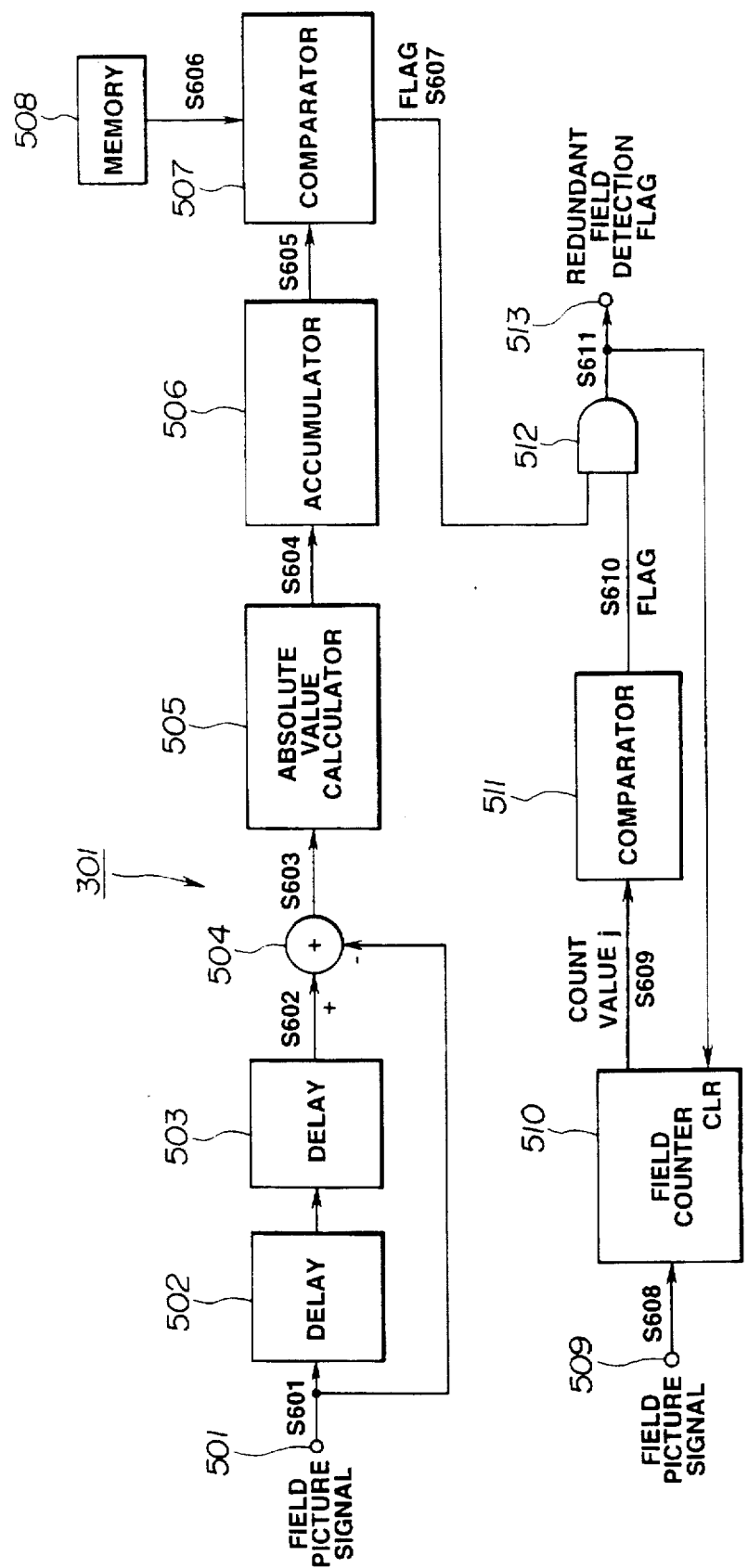
FIG. 7 is a block diagram showing an illustrative construction of a pre-processor constituting the moving picture signal encoding apparatus shown in FIG. 6.

(2) Since a smoothing filter is used after the 2-3 pull-down along the time axis, that is between the fields or frames, redundant fields 14 become difficult to detect depending upon the picture pattern. In effect, there are occasions wherein a flag S607 explained subsequently in connection with FIG. 7 is not set for a redundant field. That is, the flag is occasionally not useful in a comparator 507 shown in FIG. 7 even although the field is a redundant field.

Figure 5:
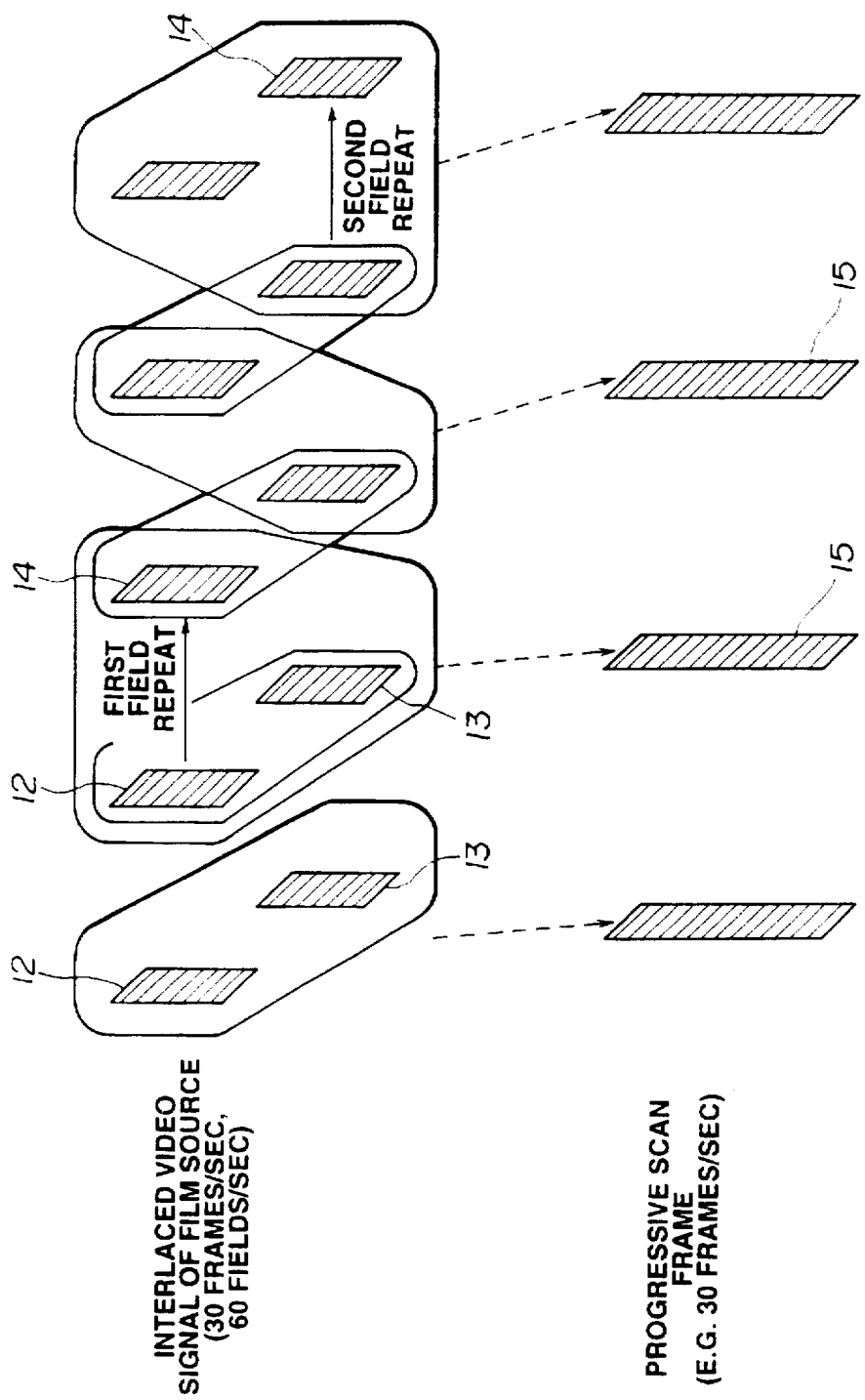
FIG. 5 illustrates an illustrative example in which inverse 2-3 pull-down is carried out incorrectly.

FIG. 5 shows an illustrative example in which a redundant field 14 has not been detected and the inverse 2-3 pull-down has been carried out incorrectly. The encoding frame rate then is 30 Hz. Since in effect the inverse 2-3 pull-down is not necessarily carried out ideally, the encoding frame rate is not necessarily constant but is varied in a range of from 24 Hz to 30 Hz. Consequently, with the MPEG2, the time of duration of GOP made up of N (N≧1) is not constant. It is envisaged with the present invention to correctly control the amount of the information generated by encoding in such case from one GOP to another.

In the following explanation, the value of N may be fixed or variable. For example, the value of N may be controlled to be larger or smaller if the same scene lasts for prolonged time or if the scene is changed at a short time interval.

First Embodiment

Figure 6:
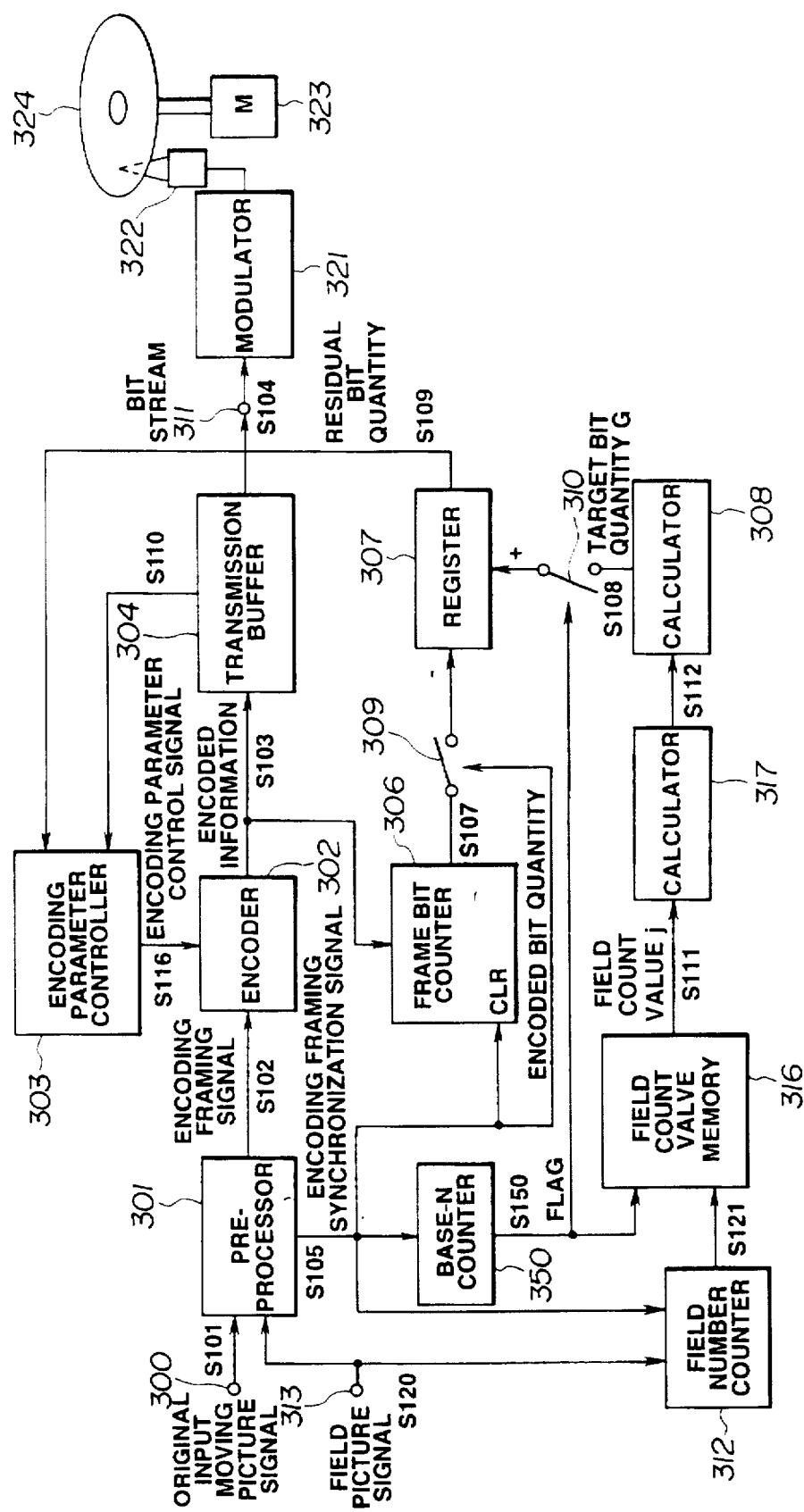
FIG. 6 is a block diagram showing the construction of a moving picture signal encoding apparatus according to a first embodiment of the present invention.

The moving picture signal encoder according to the first embodiment of the present invention has a pre-processor 301 for removing redundant fields from the original input picture signal S101, an encoding unit 302 for encoding an encoding frame signal S102 from the pre-processor 301, an encoding parameter controller 303 for controlling the encoding parameter of the encoding unit 302 and a transmission buffer 304 for outputting the encoded information from the encoding unit 302 at a constant bit rate, as shown in FIG. 6.

The moving picture signal encoder frees the film source video signals, entering a terminal 300 as original input picture signal S101, of video signals of redundant fields to generate an encoding frame signal S102, which is encoded. The resulting encoded information S103 is transiently stored in the transmission buffer 304 and subsequently outputted over a transmission channel at a terminal 311 as a bit stream S104 at a pre-set transmission bit rate.

The moving picture signal encoder is also configured for appending an error correction code to the bit stream S104 by a modulator 321, modulating the resulting data in a manner suited for recording and for driving an optical pickup 322 with the modulated bit stream S104 for encoding and recording the film source video signals on a magneto-optical disc 324 run in rotation by a motor 323. The encoding unit 302, the encoding parameter controller 303 and the transmission buffer 304 perform the same role as that of the corresponding components 102 to 104 of the conventional encoder and hence the description therefor is omitted for clarity. That is, the encoding unit 302 is designed pursuant to the MPEG2 and is made up of a motion compensated prediction encoding unit, a DCT circuit, a quantizer and a variable length encoder. The recording medium for recording moving picture films, that is the bit stream S104, may be exemplified by a magnetic disc or a magnetic tape.

In this manner, the film source video signals are encoded and transmitted or otherwise recorded on a moving picture signal recording medium. With the present moving picture encoder, the amount of the information generated from one GOP to another may be controlled correctly even in cases wherein the encoding frame rate is fluctuated in a range of from 24 Hz to 30 Hz.

Referring to FIG. 6, the moving picture encoder includes a field number counter 312 for calculating the number of fields in each encoding picture group consisting of N frames divided from the original input picture signal S101, and a field count value memory 316 for storing the number of fields from the field number counter 312. The encoder also includes a calculator 317 for calculating the time length of the encoding picture group based upon the number of fields stored in the memory 316 and a calculator 308 for calculating the target amount of bits G based upon e.g., the duration from the encoding unit 302. The encoder also includes a base-N counter 350 for counting the number of frames of the encoding frame signal S102 entering the encoding unit 302, and a frame bit counter 306 for counting the number of bits of the encoding information S103 from the encoding unit 302. The encoder also includes a register 307 for subtracting the encoding bit amount S107 from the frame bit counter 306 from the target bit amount G, and a switch 307 for supplying the encoding bit amount S107 from the frame bit counter 306 to the register 307. The encoder finally includes a switch 310 for supplying the target bit amount G from the calculator 308 to the register 307 based upon a flag S150 from the base-n counter 350.

Referring to FIG. 7, the pre-processor 301 for detecting and removing redundant fields by inverse 2-3 pull-down includes delay units 502, 503 for sequentially delaying a field picture signal S601, and an adder 504 for calculating the difference between a delayed picture signal S602 from the delay unit 503 and the field picture signal S601. The pre-processor also includes an absolute value calculator 505 for calculating the absolute value of the difference value from the adder 504 and an accumulator 506 for finding the sum of one-filed absolute values from the absolute value calculator 505. The pre-processor also includes a comparator 507 for comparing the accumulated value from the accumulator 506 to a pre-set threshold stored in a memory 508 and a field counter 510 for counting the number of fields entering the pre-processor. The pre-processor also includes a comparator 511 for comparing the number of fields from the field counter 510 to a pre-set value, and an AND gate 512 for finding a logical product of the flags S607 and S610 from the comparators 507 and 511.

The delay unit 502 is fed via a terminal 501 with the original input picture signal S101, as the field picture signal S601, entering the pre-processor 301 via terminal 300 of FIG. 6. The delay units 502, 503 sequentially delay the field picture signal S601 of e.g., 60 Hz, supplied via terminal 501, and send the delayed signal to an adder 504. The adder 504 finds the pixel-based difference between the field picture signal S601, supplied thereto via terminal 501, and the field picture signal S602 delayed by two fields by field delay units 502, 503, that is subtracts the field picture signal S601 from the field picture signal S602, pixel by pixel, and transmits the resulting difference to the absolute value calculator 505.

The absolute value calculator 505 finds the absolute value of the pixel-based difference S603 and sends the absolute value to the accumulator 506 as an absolute value S604. The accumulator 506 finds the field-based sum of the absolute values S604 and sends the sum as an accumulated value S605 to the comparator 507.

The comparator 507 is fed with a pre-set value, previously stored in the memory 508, as a threshold value S606. The comparator compares the accumulated value S605 supplied from the accumulator 506 to the threshold value S606. If the accumulated value S605 is smaller than the threshold value S606, the comparator sets a flag S607 which is fed to the AND gate 512.

The field counter 510 is fed via terminal 59 with the field synchronization signal S120, as a field picture signal S608, entered to the pre-processor 301 via terminal 313 shown in FIG. 6. The field counter 510 counts the number of fields entering the pre-processor 301. The field counter 510 sends the count value j to the comparator 511 as a signal S609. If the count value j of the signal S609 is an odd number not less than 5, the comparator 511 sets the flag S610 to 1 and feeds the flag to the AND gate 512.

The AND gate 512 finds the logical sum of the flag S607 from the comparator 507 and the flag S610 from the comparator 511. If the flags S607 and S610 are both 1, the redundancy field detection flag S611 is set to 1 and outputted at a terminal 513. That is, the currently entered field picture signal S601 is judged to be a redundant field overlapped by 2-3 pull-down. If the redundancy detection flag S611 is 1, the field counter 510 is cleared to zero.

Figure 3:
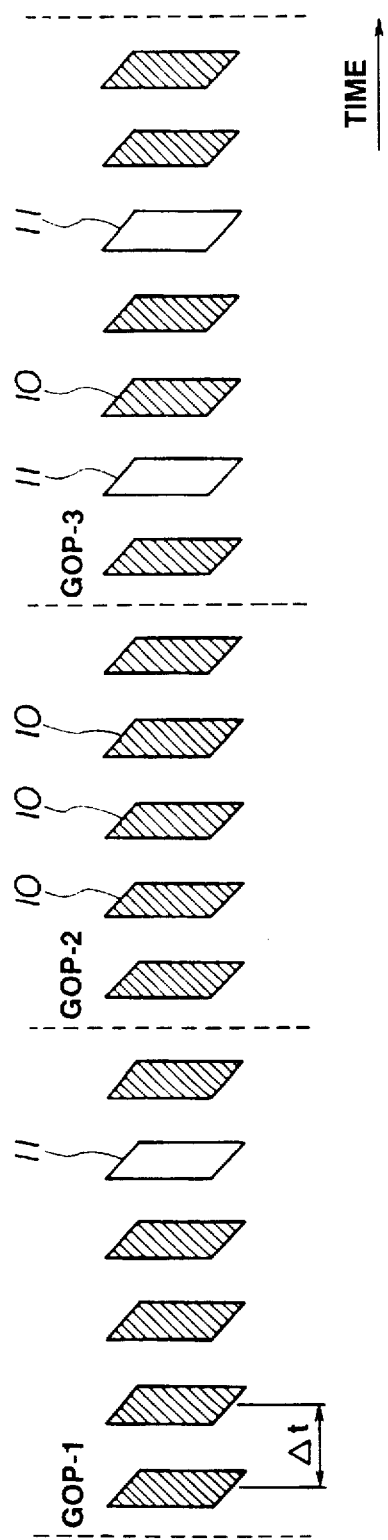
FIG. 3 illustrates the principle of encoding in which redundant pictures are removed at an irregular period.

Based upon the redundant field detection flag S61, thus detected, the pre-processor 301 removes the field found to be redundant as shown in FIG. 3 and sends video signals of the remaining fields as encoding frame signals S102 to the encoding unit 302. The encoding unit 302 encodes the encoding frame signals S102 as described previously. Thus the moving picture signals of the removed fields are not encoded.

The present moving picture signal encoding apparatus, which encodes the encoding frame signal freed of the redundant fields as described above, differs significantly from the conventional moving picture encoder shown in FIG. 1 in controlling the target bit amount G allocated to the GOP by the field count value j from the field count value memory 316.

That is, the present moving picture signal encoder employs a two-pass encoding method. During the first pass, the original input picture signal is divided into encoding picture groups based on N frames (Nβ1). The number of fields of the original input picture signal entered at the time of the preparation of the encoding picture groups is counted and stored in a memory. During the second pass, when the original input picture signal of the encoding picture group is encoded, the number of fields associated with the encoding picture group is read out from the memory. Based on this value, the target number of bits G of the encoding picture group, that is the target value of the amount of bits of the information generated by encoding, is calculated for controlling the target bit amount G.

Figure 8:
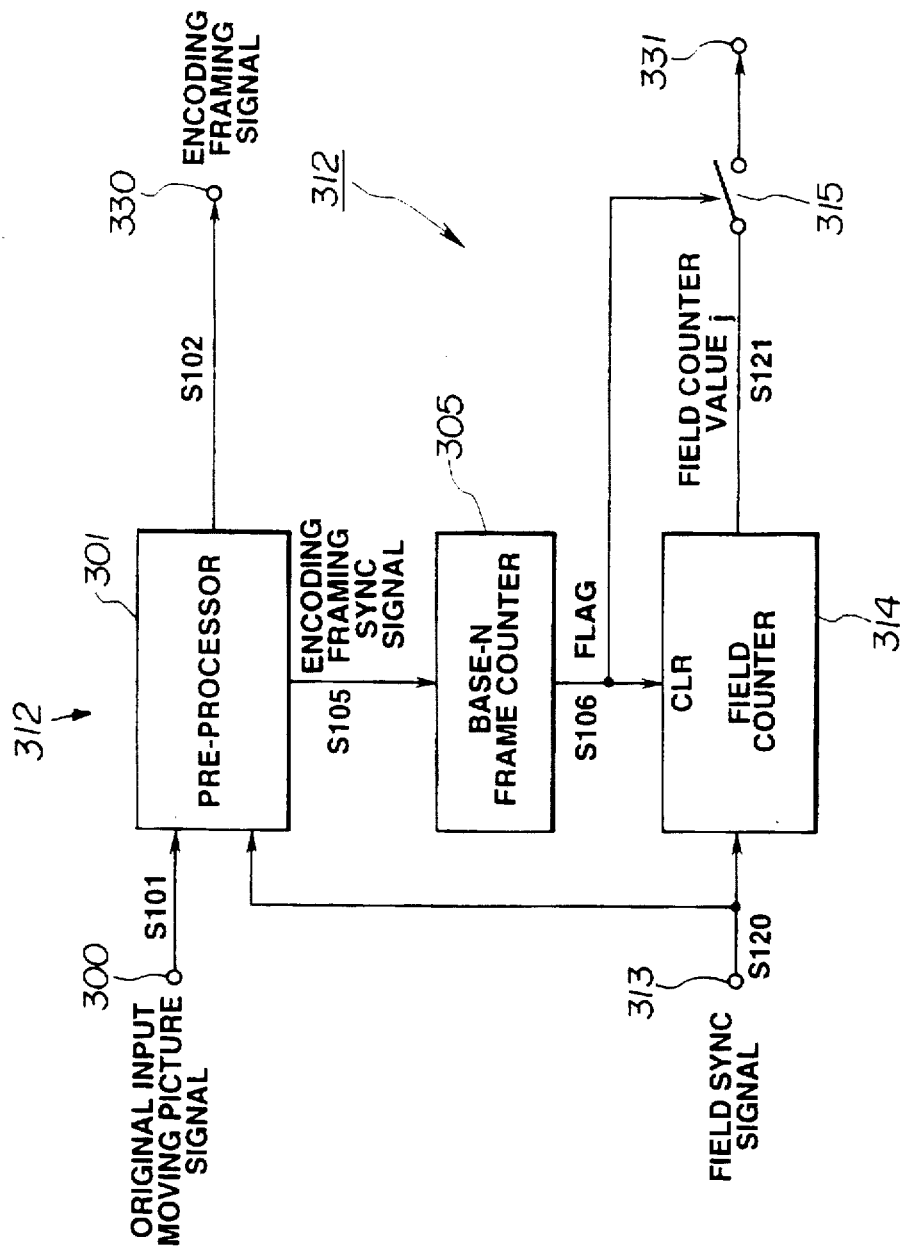
FIG. 8 is a block diagram showing an illustrative construction of a field number calculator constituting the moving picture signal encoding apparatus shown in FIG. 6.

Specifically, the field number counter 312 is a circuit for realizing the sequence of operations for the first pass. As shown in FIG. 8, the field number counter includes a base-N frame counter 305 for counting the encoding frame synchronization signal S105 for the pre-processor 301, a field counter 314 for counting the field synchronization signal S120, and a switch 315 for sending the field count value j from the field counter 314 to a field count value memory 316.

The pre-processor 301 is comprised of an inverse 2-3 pull-down. When freeing the film source original input picture signal S101 entering the pre-processor 301 via the terminal 300 at a frame rate of 30 Hz of redundant fields to generate the encoding frame signal S102 which is sent to the encoding unit 302, the pre-processor sends the encoding frame synchronization signal S105 synchronized with the output of the encoding frame signal S102 to the base-N frame counter 305.

The base-N frame counter 305 counts the encoding frame synchronization signal S105 from 1 to N and, when the count value reaches N, the base-N counter 305 sets the flag S106 to 1 and outputs the flag. The base-N counter 305 controls the field counter 314 and the switch 315 by this flag S106.

The field counter 314 is fed via a terminal 313 with a field synchronization signal S120, synchronized with the field of the original input picture signal S101. The field counter 314 is cleared to zero when the flag S106 from the base-N counter 305 is 1 and counts the field synchronization signal S120. The field counter 314 sets the count value to a signal S121 which is fed via switch 315 and terminal 331 to the field count value memory 316. The switch 315 is controlled by the flag S106 from the base-N counter 305 and is turned on when the flag S106 is 1. That is, the field count value memory 316 is fed with a field count value j specifying the number of fields which entered the pre-processor 301 when the current encoding picture group was prepared. The result is that the field count value j for each encoding picture group is sequentially stored in the field count value memory 316. The above operation constitutes the first-pass operation.

Referring to FIG. 6, the operation for the second pass is explained. The frame bit counter 306, register 307 and the switches 309, 310 shown in FIG. 6 perform the same function as that of the frame bit counter 106, register 107 and the switches 109, 110 of the conventional moving picture encoder shown in FIG. 1 and hence are not explained for simplicity.

The pre-processor 301 frees the original input picture signal supplied thereto via the terminal 300 of redundant fields to produce the encoding frame signal S102 which is supplied to the encoding unit 305. At this time, the pre-processor 301 sends the encoding frame synchronization signal S105 to the base-N counter 350 in timed relation to the outputting of the encoding frame signal S102. The pre-processor also controls the switch 309 by the encoding frame synchronization signal S105. The pre-processor 301 appends the information as to whether the redundant field has been removed and the position information of the removed field to the header information of the encoding frame signal S102.

The base-N frame counter 350 counts the encoding frame synchronization signal S105 sent from the pre-processor 310 for counting the number of frames entering the encoding unit 102 from 1 to N. When the count value reaches 1, that is when the encoding frame signal S102 of the current encoding picture group which is encoded first enters the encoding unit 302, the base-N frame counter 350 sets the flag S150 to 1. The base-N frame counter 350 controls the field count value memory 316 and the switch 310 based on this flag S150.

In the field count value memory 316, the field count values j for all of the encoding picture groups, obtained by the first pass, are stored. Each time the flag S150 is 1, the field count values j stored in the memory 316 are sequentially read out. The field count values j thus read out are sent as the signal S111 to a calculator 317.

The calculator 317 converts the field count value j, supplied as the signal S111, into a value of a different dimension, such as the duration (display) of the encoding picture group as found by the equation (4):

$$\Delta T = j \times (\text{field period}) \quad (4)$$

The calculator 317 sends the duration ΔT as a signal S112 to the calculator 308 configured for calculating the target bit amount G.

The calculator 308 calculates the target bit amount G allocated to the encoding picture group, based upon the duration ΔT of the current encoding picture group, in accordance with the equation (5):

$$G = \text{bit\_rate} \times \Delta T \quad (5)$$

where bit_rate is the bit rate of the bit stream S104 outputted from the transmission buffer 304. The calculator 308 sends the calculated target bit amount G as a signal S108 to the register 307 via switch 310.

It is also possible for the calculator 317 to find the encoding frame rate R of the encoding picture group in accordance with the equation (6):

$$R = N/(j \times (\text{field period})) \quad (6)$$

while it is also possible for the calculator 308 to find the target bit amount G in accordance with the following equation (7):

$$G = \text{bit\_rate} \times N/R \quad (7)$$

using the encoding frame rate R.

The target bit amount G thus found is sent to the register 307, via the switch 310 controlled by the flag S150 from the base-N frame counter 350, at the time of encoding the first encoding frame signal S102 of the encoding picture group.

The register 307 is fed, via the switch 309 controlled by the encoding frame synchronization signal S105 from the pre-processor 301, with the encoding bit amount S107 from the frame bit counter 306. Each time the encoding frame signal S102 for one frame is encoded, the register 307 subtracts the encoding bit amount S107 from the target bit amount G to send a residual amount S109 of the target bit amount G to the encoding parameter controller 303.

The encoding parameter controller 303 controls the encoding parameter of the encoding unit 302 by an encoding parameter control signal S116 derived from the residual amount S109 of the target bit amount G. The control operation by the encoding parameter controller 303 is so made that the target bit amount G allocated to the encoding picture group approaches the actually produced bit amount. If the encoding unit 302 is pursuant to the MPEG2, the encoding parameter controller 303 controls the quantization step size for encoding.

Thus it is possible with the moving picture signal encoder of the present invention to control the amount of the generated information correctly even if, during encoding of the moving picture signal, the encoding frame rate is varied from one encoding picture group to another due to pre-processing such as elimination of redundant pictures from the input moving picture. In addition, it is possible with the present moving picture encoder to overcome the problem of the conventional moving picture signal encoder, namely the output bit rate exceeding the target amount significantly, by adaptively changing the target bit amount G in connection with changes in the encoding frame rate from one picture group to another.

Also it is possible with the present moving picture encoder to overcome the problem that the total bit amount of the bit stream exceeds the target value such that the bit stream cannot be recorded on the desired moving picture signal recording medium.

In addition, the transmission buffer capacity may be controlled stably as a result of which the encoding parameters may be controlled stably and a stable clear picture may be produced.

On the moving picture signal recording medium, such as a magneto-optical disc, the bit stream obtained by the above-described encoding is recorded.

The moving picture signal encoder according to a second embodiment of the present invention is now explained.

Figure 9:
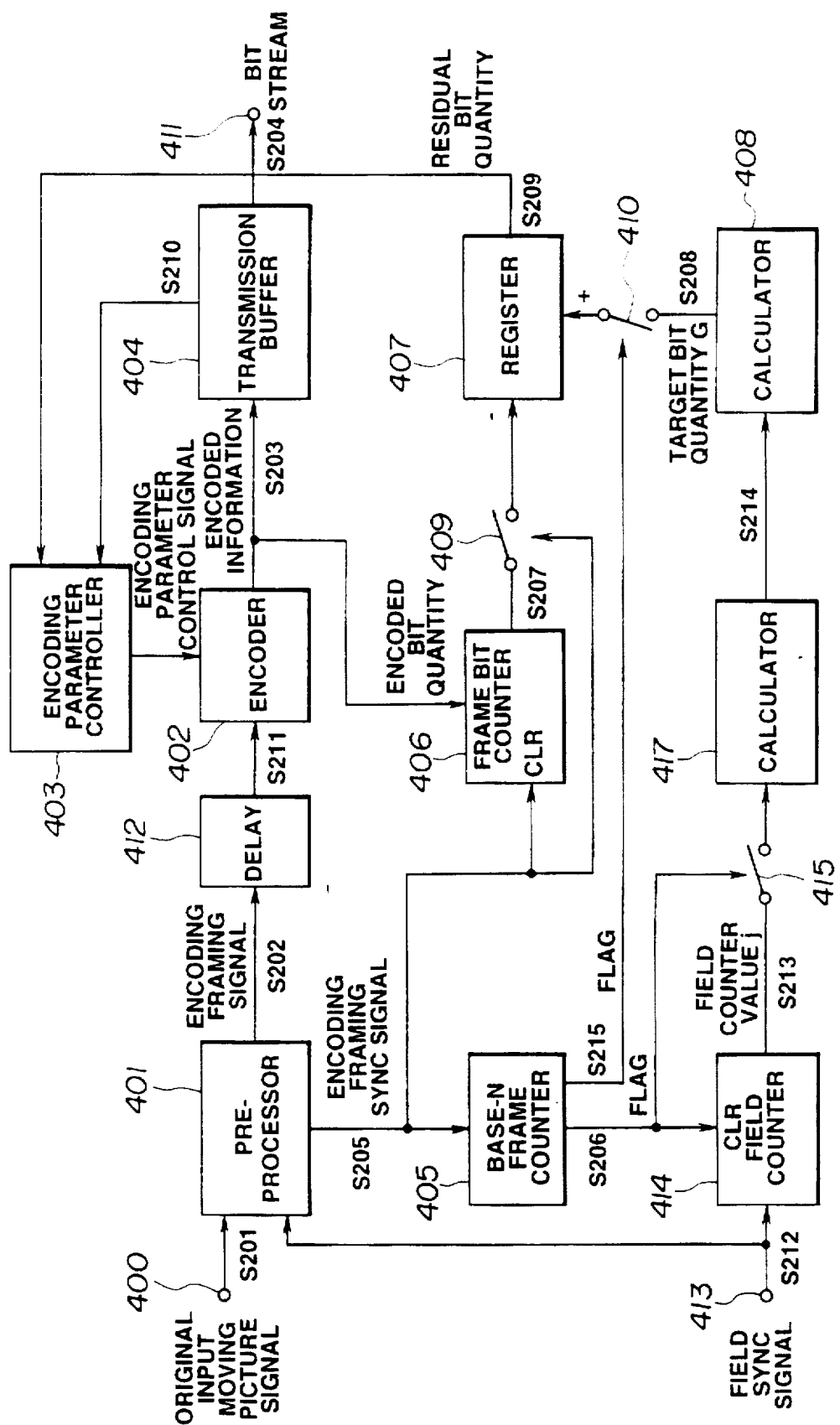
FIG. 9 is a block diagram showing the construction of a moving picture signal encoding apparatus according to a second embodiment of the present invention.

Referring to FIG. 9, the moving picture signal encoder according to the present second embodiment includes a pre-processor 401 for freeing the original input picture signal of redundant fields, and a delay unit 412 for delaying the encoding frame signal S202 from the pre-processor 401. The moving picture signal encoder also includes an encoding unit 402 for encoding the encoding frame signal S211 delayed by the delay unit 412 and an encoding parameter controller 403 for controlling the encoding parameters of the encoding unit 402. The moving picture signal encoder also includes a transmission buffer 404 for outputting the encoded information S203 from the encoding unit 402 at a pre-set pitch rate, and a field counter 414 for counting the number of fields of each of N-frame based encoding picture groups divided from the original input picture signal S201. The moving picture signal encoder also includes a calculator 417 for calculating the duration of the encoding picture group based upon the number of fields from the field counter 414, and a calculator 408 for calculating the target bit amount G based upon the duration from the delay unit 412. The moving picture signal encoder also includes a base-N frame counter 405 for counting the number of frames of the encoding frame signal S202 entering the delay unit 412 and a frame bit counter 406 for counting the number of bits of the encoded information S203 from the encoding unit 402. The moving picture signal encoder also includes a register 407 for storing the target bit amount G from the calculator 408 and for subtracting the encoded bit amount S207 from the frame bit counter 406 from the target bit amount G, and a switch 409 for supplying the encoded bit amount S207 from the frame bit counter 406 to the resister 407 based upon the encoding frame synchronization signal S205 from the pre-processor 401. The moving picture signal encoder also includes a switch 410 for supplying the target bit amount G from the calculator 408 to the register 407 based upon the flag S215 from the base-N frame counter 450.

That is, the present moving picture encoder has the delay unit 412 between the pre-processor 401 and the encoding unit 402, while having the field counter 414 and the switch 416 in place of the field number counter 312 and the field count value memory 316 of the above-described moving picture signal encoder. In other words, the present moving picture signal encoder significantly differs from the conventional moving picture signal encoder shown in FIG. 1 in controlling the target bit amount G accorded to e.g., a N-frame based encoding picture group, such as GOP, where $N \geq 1$, by the field count value j from the field counter 414. In the present moving picture signal encoder, the encoding parameter controller 403, transmission buffer 404, frame bit counter 406, register 407 and the switches 409, 410 have the same functions as those of the encoding parameter controller 103, transmission buffer 104, frame bit counter 106, register 107 and the switches 109, 110, so that these components are not explained for simplicity.

The pre-processor 401 is comprised of an inverse 2-3 pull-down circuit for removing redundant fields from the original input picture signal S201, which is e.g., a film-source video signal entering a terminal 400 at a frame rate of 30 Hz, to produce an encoding frame signal S202 which is supplied to the delay unit 412. The pre-processor 401 feeds the encoding frame synchronization signal S205, synchronized with the outputting of the encoding frame signal S202, while controlling the switch 409 by the encoding frame synchronization signal S205.

The delay unit 412 is comprised e.g., of a frame memory for delaying the encoding frame signal S202 by one frame and for sending the delayed encoding frame signal S211 to the encoding unit 402. The encoding frame signal S211 is encoded by the encoding unit 402, as in the case of the conventional moving picture signal encoder.

The base-N counter 405 counts the encoding frame synchronization signal S205, fed from the pre-processor 401, from 1 to N. When the count value becomes N, the base-N counter sets the flag S206 to 1. Subsequently, when the count value becomes 1, the base-N counter sets the flag S215 to 1.

The field counter 414 is fed via terminal 413 with a field synchronization signal S212, synchronized with the field of the original input picture signal S210. When the flag S206 is 1, the field counter 414 is cleared to zero and counts the field synchronization signal S212 to set the count value as the signal S213 which is fed via switch 413 to a calculator 417.

A switch 415 is turned on when the flag S206 is 1 and sends the count value to the calculator 417. When the current encoding picture group is formed, the calculator 417 is fed with the field count value j indicating the number of fields entering the pre-processor 401.

As in the first embodiment, the calculator 416 calculates the duration $\Delta T$ from the equation (4) and sends the duration $\Delta T$ as signal S214 to the calculator 408.

As in the first embodiment, the calculator 408 calculates the target bit amount G, allocated to the encoding picture group, in accordance with the equation (5), and sends the target bit amount G as signal S208 via switch 410 to the register 407.

In the present moving picture signal encoder, as in the moving picture signal encoder of the previous embodiment, the amount of the generated information is controlled on the basis of the target bit amount G. The target bit amount G may also be found from the equations (6) and (7).

Thus the effect to that achieved with the moving picture signal encoder of the previous embodiment may be achieved with the present moving picture signal encoder.

Third Embodiment

The moving picture signal encoder according to a third embodiment of the present invention is now explained. The present moving picture signal encoder employs the variable rate encoding method. In other words, the target bit amount G allocated to the encoding picture group is not constant with the present moving picture signal encoder. That is, the target bit amount G is found on the basis of the degree of coding difficulty as proposed in our previous application (JP Patent Application No.5-105943) and the amount of the generated information is controlled on the basis of the target bit amount.

Figure 10:
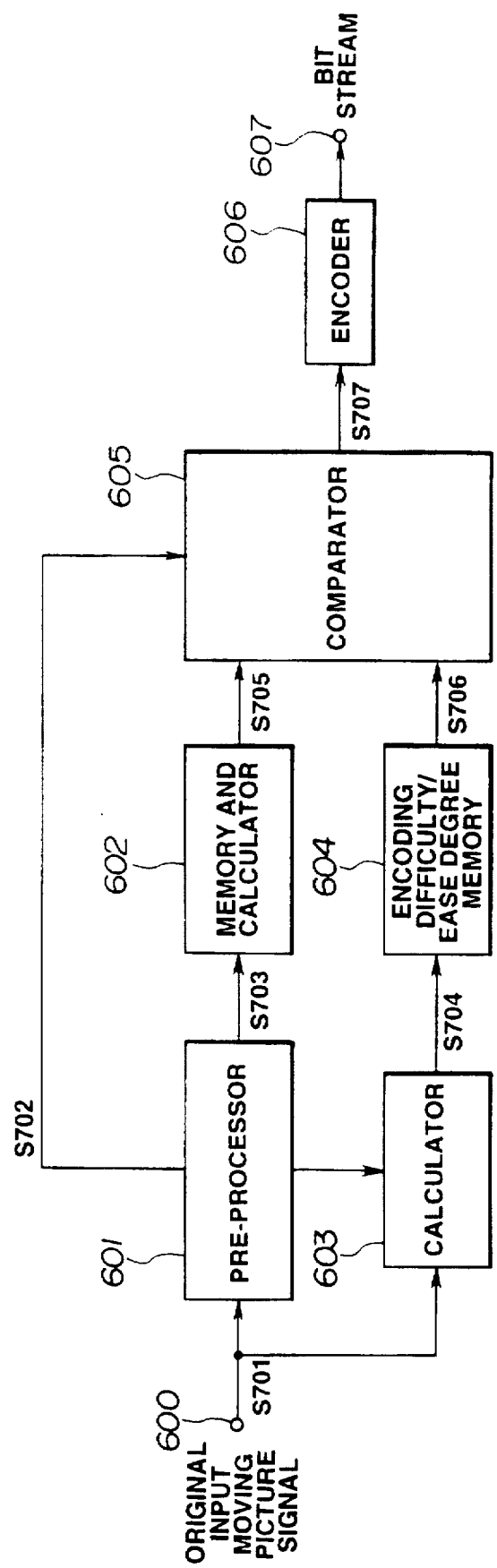
FIG. 10 is a block diagram showing the construction of a moving picture signal encoding apparatus according to a third embodiment of the present invention.

Referring to FIG. 10, the present moving picture signal encoder includes a pre-processor 601 for removing redundant fields from the original input picture signal S701, and a memory/calculator 602 for storing the number of fields of the encoding picture groups from the pre-processor 701 and calculating the duration of time based upon the number of fields stored therein. The present moving picture signal encoder also includes a calculator 603 for calculating the degree of encoding difficulty of the encoding picture groups based upon the original input picture signal S701, and a memory 604 for storing the degree of encoding difficulty from the calculator 603. The present moving picture signal encoder also includes a comparator 605 for calculating the target bit amount G based upon the duration of time from the memory/calculator 602 and the degree of encoding difficulty from the memory 604 and for setting the target bit amount G so as to be less than the maximum bit rate, and an encoding unit 606 for encoding the encoding frame signal S702 from the pre-processor 601 based upon the target bit amount G from the comparator 605.

The pre-processor 601 removes redundant fields from the original input picture signal S701 entering a terminal 600 and divides the original input picture signal S701 into N frame based encoding picture groups, where N≧1. The pre-processor then sequentially sends field count values j specifying the number of fields of respective encoding picture groups as signal S703 to the memory/calculator 602.

The memory/calculator 602 stores the field count value j supplied from the pre-processor 601 and, using these field count values j, calculates and stores the duration ΔT in accordance with the equation (4). The memory/calculator 602 sends the time duration stored therein as signal S705 to the comparator 605.

On the other hand, the calculator 603 calculates the degree of encoding difficulty S704 of each encoding picture group based upon the original input picture signal S701 entering the terminal 600 and sends the degree of encoding difficulty S704 to the memory 604. The memory 604 temporarily stores the degree of encoding difficulty S704 of each encoding picture group and sends the degree of encoding difficulty S704 stored therein to the comparator 605 as signal S706. The degree of encoding difficulty as found by the calculator 603 means the amount of information generated during encoding by e.g., MPEG2 per encoding picture group with the quantization step size equal to 1.

The comparator 605 calculates the target bit amount G allocated to each encoding picture group, based upon the time duration ΔT supplied from the memory/calculator 602 and the degree of encoding difficulty supplied from the memory 604. For example, the comparator calculates the target bit amount G in proportion to the degree of encoding difficulty. In general, in the variable rate encoding method, the maximum value of the target bit amount G is limited by the ability of the transmission system, for example, by the transmission bit rate. Thus the mean bit rate per N frames is designed not to surpass a pre-set maximum value. That is, the comparator 605 finds the mean bit rate bit_rate every N frames in accordance with the equation (8):

$$\text{bit\_rate} = G/\Delta T \tag{8}$$

and clips the mean bit rate bit_rate to its maximum value maximum bit_rate. On the other hand, if the mean bit rate bit_rate is clipped, the comparator 605 calculates the bit amount ΔG which has not been used for this reason in accordance with the equation (9):

$$\Delta G = (\text{bit\_rate} - \text{maximum\_bit\_rate}) \times \Delta T \tag{9}$$

and supplements the bit amount ΔG for encoding remaining encoding picture groups. For example, the comparator 605 adds the bit amount ΔG to the target bit amount G of the following encoding picture groups.

In the above equations (8) and (9), G is the target bit amount as found based upon the degree of encoding difficulty of the encoding picture groups and ΔT is the time duration of the encoding picture groups.

The comparator 605 sends the target bit amount G, found as described above, to the encoding unit 606 as signal S707.

The encoding unit 606 is fed with the encoding frame signal S702 of the current encoding picture group from the pre-processor 601. The encoding unit 606 encodes the encoding frame signal S702 based upon the target bit amount G supplied thereto from the comparator 605. The encoding unit 606 outputs the encoded information as a bit stream at a terminal 607.

What is claimed is:

1. An apparatus for MPEG encoding input interlaced video signals produced by 2-3 pulldown conversion, comprising:

means for forming groups of pictures for MPEG encoding each group comprising a pre-set number of encoding pictures from a plurality of original pictures represented by said input interlaced video signals, wherein said original pictures comprise frames of said moving picture signal, and said encoding pictures are produced by removing those original pictures which are redundant within said frames;

means for calculating the number of original pictures used for forming said encoding picture groups in said group forming means;

means for calculating the group-based target bit amount based upon the calculated number of said original pictures from said original picture number calculating means;

means for MPEG encoding the interlaced video signals of the encoding pictures; and encoding parameter control means for controlling a quantization step size of MPEG encoding said interlaced video signals such that said means for MPEG encoding encodes a respective group of pictures having said target bit amount.

* * * * *